UNITED STATES PATENT OFFICE.

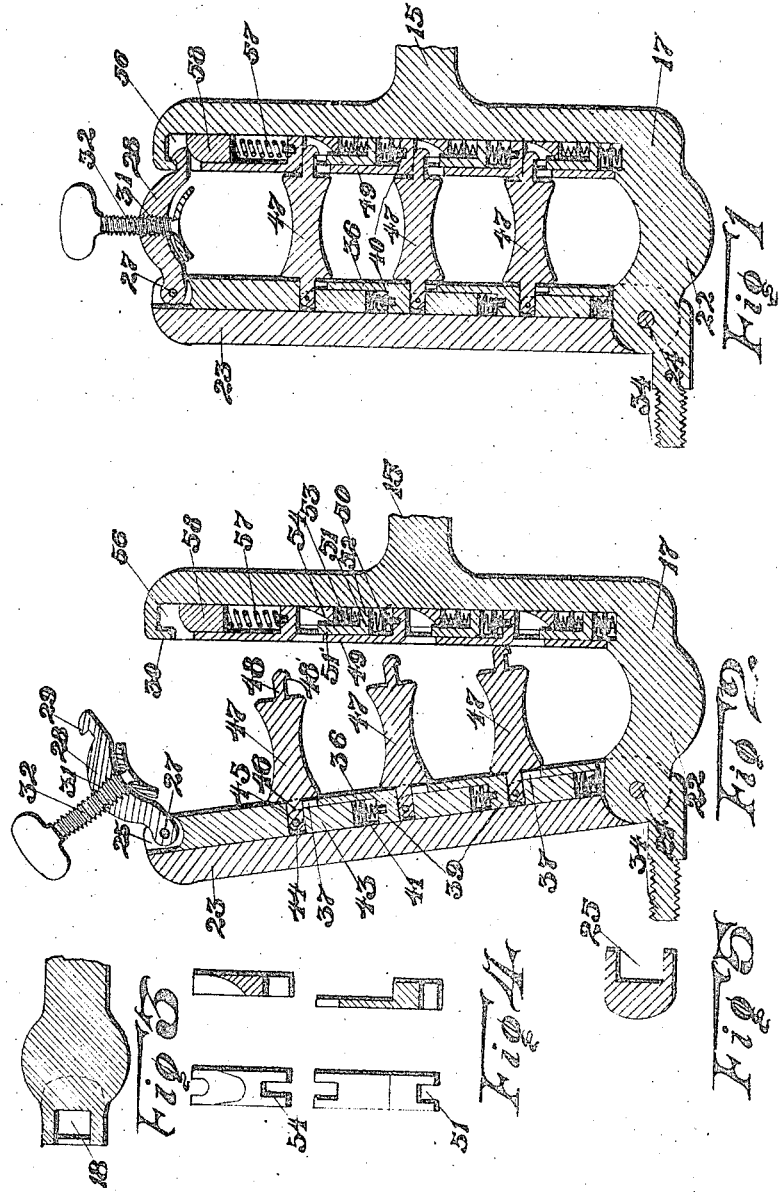

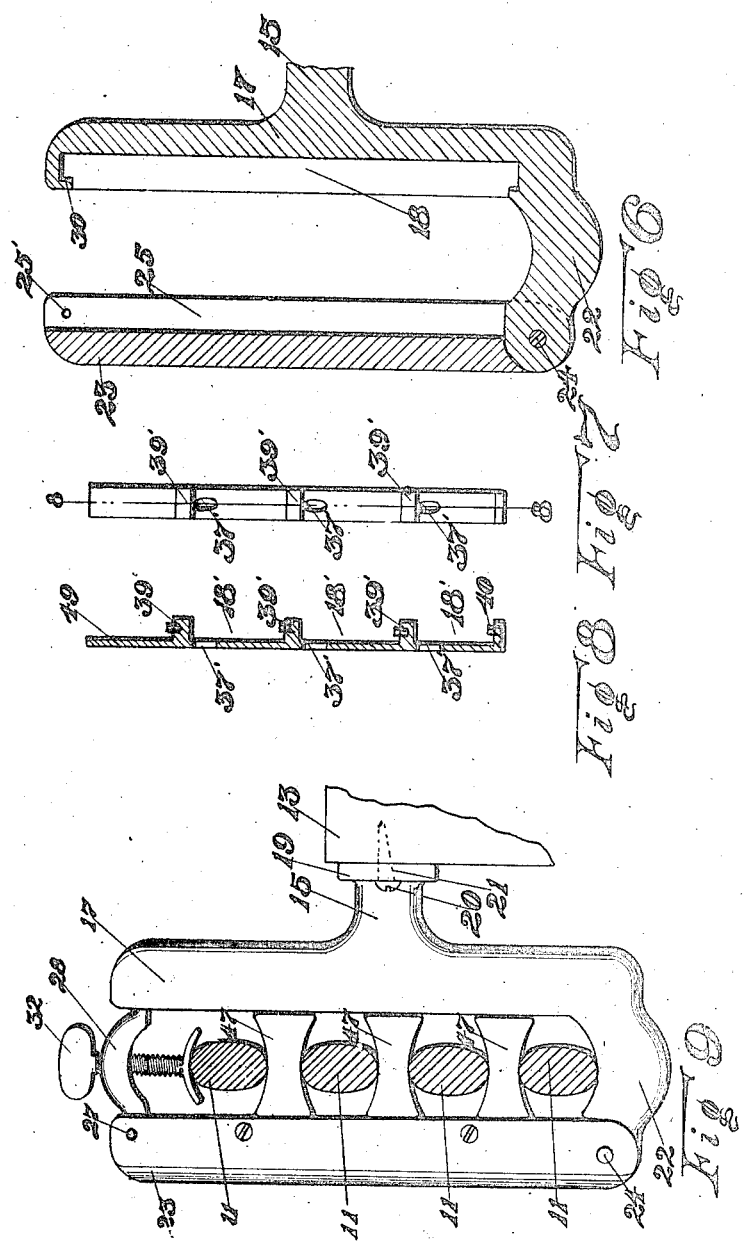

NEIL J. McLEAN, OF PORTLAND, OREGON.

BOW-REST FOR VEHICLE-TOPS.

952,131.     Specification of Letters Patent.    Patented Mar. 15, 1910.

Application filed June 17, 1908. Serial No. 438,986.

*To all whom it may concern:*

Be it known that I, NEIL J. McLEAN, a citizen of the United States, residing at Portland, in the county of Multnomah and State of Oregon, have invented certain new and useful Improvements in Bow-Rests for Vehicle-Tops, of which the following is a specification.

This invention relates to automobile tops, and more particularly to bow rests therefor, and has for its object to provide such an article arranged for adjustment between the standards of folding automobile tops to prevent abrasion of the cloth thereof when in folded position.

Another object is to provide such an article which will be adjustable to different sizes of tops.

Another object is to provide such an article which will be readily detachable and which will be effective in operation.

Another object is to provide such an article which will be arranged for automatic locking engagement between the standards of the top.

Other objects and advantages will be apparent from the following description and it will be understood that changes in the specific structure shown and described may be made within the scope of the claims, without departing from the spirit of the invention.

In the drawings forming a portion of this specification and in which like numerals of reference indicate similar parts in the several views, Figure 1 is a general sectional view of the rest in closed position, Fig. 2 is a similar view of the rest in open position, Fig. 3 is a sectional view through the base member at right angles to Fig. 1, Fig. 4 is a detail of the sliding latch member carried by the base portion, Fig. 5 is a sectional view of the pivoted member at right angles to Fig. 1, Fig. 6 is a longitudinal sectional view of the base and pivoted members with the working parts removed, Fig. 7 is a detail of the retaining member 49, Fig. 8 is a sectional view on the line 8—8 of Fig. 7, Fig. 9 is a view of the bow rest in engagement with an automobile top.

The present bow rest is shown upon a portion of an automobile 13 and comprises a base portion 15 having a body portion 17 in which a longitudinally extending channel 18 is formed and from which extends the fastening arm 19 secured to an automobile 13 by means of screws 20 engaged through perforations 21 in the arm 19. The lower end of the body portion 17 extends laterally outward to provide a pivot arm 22 to the outer end of which a pivot arm 23 is secured by means of a bolt 24. The arm 23 is provided with a longitudinally extending channel 25 similar to that 18 formed in the body portion 17. The upper portion of the arm 23 is provided with a lateral opening 25' through which is engaged a bolt 27 carrying a binding member 28 pivotally engaged on the bolt, its free end being provided with an outwardly turned flange 29 for engagement under an inwardly turned flange 30 at the upper end of the channel 18, of the body portion 17. The arm 23 is held in spaced relation with the body portion 17. A threaded opening 31 extends laterally through the binding member 28 and has engaged therein a thumb screw 32 having a swiveled plate at its inner end and provided with a concave inner surface for a purpose to be subsequently disclosed. A laterally extending threaded pin 24 is carried at the outer end of the pivot arm 22 and arranged for the engagement thereon if desirable of a goose neck for supporting the bows of the automobile top.

A retaining member 36 is engaged in the channel 25 and comprises a bar having perforations 37 at spaced intervals adjacent to which are located inwardly spaced partitions 39; a series of chambers thus being formed for a purpose presently to be described. Upwardly extending pins 40 are carried by each of the partitions 39 and seated on the pins 40 there are helical springs 41 bearing against sliding blocks 43 slidably engaged within the chamber. Each block 43 is provided at its upper end with a pivot opening 44 through which there is engaged a pivot pin 45 supporting a pivot arm 46 extending through the opening 37 and carrying a separating member 47. The arms 46 are arranged for sliding movement in the openings 37 longitudinally of the arm 23. The separating members 47 bearing at their free ends latch arms 48 have downwardly directed bills 48'.

A retaining member 49 similar to the member 36 is secured in the channel 18 thus forming a plurality of chambers 18' having communicating openings 37' similar to those in the oppositely disposed pivot arm. Helical springs 50 are seated in the base of each of these chambers and support the latch members 51 having latch arms 51' and bases 52 extending therefrom, the latch portion being arranged to lie in sliding engagement with the retaining member below the opening 37' and tending to close the opening under the pressure of the spring 50, leaving a space in the chamber between the inner wall of the channel and the said latch portion, this space being closed by the arm 52 in engagement with the spring 50. In the space formed between the latch portion and the inner wall of the channel there is located a helical spring 53 supporting a block 54 which bears against the extremity of the latch arm 48 to hold it out of engagement with the latch arm 51 until downward pressure is applied on the separating member. The latch arm 48 is provided with a downwardly extending bill 48' which engages over and inwardly of the latch arm 51 when it is forced downwardly against the block 54. An additional chamber 56 is formed in the upper end of the channel 18 by the retaining member 49 and seated therein is a helical spring 57 bearing upon a block 58 which is thus pressed against the upwardly directed flange 29 of the connecting portion 28 to hold it yieldably against disengagement from the downwardly directed flange 30.

In use, when an automobile top is folded, the bow rest is engaged with the bows, one of each of the separating members 47 being engaged between the adjacent bow arms. The screw 32 is then operated to secure the standards firmly against movement; the resultant downward movement of the separating members 47 causes the engagement of the portions 48 with the latch arms 51', accompanied by a corresponding downward movement of the arms 46 and the blocks 43. The removal of pressure from the separating arms 47 causes their upward movement under the tension of the springs 41 and 50, and will release the bills 55 from the latch arm 51' thus allowing disengagement of the rest from the bows of the automobile top by the outward movement of the pivot member 23.

It will thus be seen that an article is provided which is adapted for use with various types of automobile tops to prevent rapid wear of the material composing the top.

The size and number of the separating members 47 may be increased when necessary.

What is claimed is:

1. An article of the class described comprising a base, spaced latch engaging members carried by the base, a pivoted arm carried by the base, resiliently spaced separators carried by said arm for separating and supporting the bows of folding vehicle tops, said separators being arranged for disengageable latching engagement with the base member, means for compressing the engaged bow portions rigidly against vibratory movement and means for securing the base portion against the side of a vehicle.

2. A bow rest for automobile tops comprising a stationary member having a plurality of spring pressed latches thereon, a confining member pivoted upon the base member, a plurality of separators carried thereby and having portions adapted for engagement by the latches and means carried by the confining member for compressing bows upon the separators.

3. A bow rest including a base member having a plurality of spring-pressed latches thereon, a confining member pivoted thereon and adapted to lie in parallel spaced relation therewith at times, longitudinally spaced resiliently supported separators carried between the base and the confining member and adapted to engage the latches when pressed upon laterally and means for compressing bow portions between the separators to hold the bows against vibration and to force the separators into engagement with the latches.

4. A device of the class described, comprising a base portion, a confining member pivoted thereon and adapted to lie in spaced relation therewith for the reception of bow portions therebetween, resiliently supported separating members carried between the base and the confining member, a cross piece adapted for latching engagement between the confining member and the base, and means for compressing bow portions upon and between the separator members.

5. An article of the class described comprising a base portion, a plurality of spaced recesses therein, a plurality of spring pressed latch members movable in the recesses, a pivoted confining member carried by the base member in spaced relation therewith, a plurality of longitudinally movable spring pressed pivot blocks carried by the confining member, a plurality of separators pivoted upon the blocks, said separators having projections adapted for engagement in the first named recesses for latching engagement with the latch members, a movable cross piece adapted for rigid engagement between the base and the confining member and a clamping member carried thereby adapted for operation to compress bow portions between the base and the confining member.

In testimony whereof I affix my signature, in presence of two witnesses.

NEIL J. McLEAN.

Witnesses:
A. J. MATTER,
G. O. MATTER.